(12) United States Patent
Song

(10) Patent No.: US 7,684,765 B2
(45) Date of Patent: Mar. 23, 2010

(54) TRANSMIT ANTENNA SWITCHING APPARATUS AND METHOD IN MIMO SYSTEM

(75) Inventor: Jong-Ho Song, Seoul (KR)

(73) Assignee: Samsumg Electronics Co., Ltd (KR)

( * ) Notice: Subject to any disclaimer, the term of this patent is extended or adjusted under 35 U.S.C. 154(b) by 814 days.

(21) Appl. No.: 11/508,572

(22) Filed: Aug. 23, 2006

(65) Prior Publication Data

US 2007/0049214 A1 Mar. 1, 2007

(30) Foreign Application Priority Data

Aug. 23, 2005 (KR) .................... 10-2005-0077204

(51) Int. Cl.
*H04B 1/44* (2006.01)
(52) U.S. Cl. .............. 455/78; 455/101; 375/260; 375/267; 375/344; 375/326; 370/329; 370/335; 370/342
(58) Field of Classification Search ............ 455/78, 455/101; 375/260, 267, 344, 326; 370/329, 370/335, 342
See application file for complete search history.

(56) References Cited

U.S. PATENT DOCUMENTS

| | | | | |
|---|---|---|---|---|
| 7,139,340 B2* | 11/2006 | Scarpa | ............ | 375/344 |
| 7,301,890 B2* | 11/2007 | Joo et al. | ............ | 370/208 |
| 7,426,201 B2* | 9/2008 | Kim et al. | ............ | 370/335 |
| 2004/0136465 A1* | 7/2004 | Hwang et al. | ............ | 375/267 |
| 2007/0297525 A1* | 12/2007 | Wu et al. | ............ | 375/260 |

FOREIGN PATENT DOCUMENTS

| KR | 1999-0086133 | 12/1999 |
|---|---|---|
| KR | 1020000002504 | 1/2000 |
| KR | 1020030015963 | 2/2003 |
| KR | 1020030056130 | 7/2003 |
| KR | 1020040098752 | 11/2004 |
| KR | 1020060029001 | 4/2006 |

* cited by examiner

*Primary Examiner*—Sanh D Phu
(74) *Attorney, Agent, or Firm*—The Farrell Law Firm, LLP

(57) ABSTRACT

A transmit antenna switching apparatus and method in a MIMO system are provided. The transmit antenna switching method includes determining modulation orders of users by using reception strengths of user signals with respect to each antenna; summing the determined modulation orders for each antenna; and determining an antenna having the greatest sum of the modulation orders as a transmit antenna. Accordingly, downlink performance can be remarkably improved by transmitting downlink frames through an optimal transmit antenna in accordance with channel environment.

14 Claims, 2 Drawing Sheets

TRANSMIT ANTENNA SWITCHING APPARATUS AND METHOD IN MIMO SYSTEM

PRIORITY

This application claims priority under 35 U.S.C. § 119 to an application filed in the Korean Intellectual Property Office on Aug. 23, 2005 and allocated Serial No. 2005-77204, the contents of which are incorporated herein by reference.

BACKGROUND OF THE INVENTION

1. Field of the Invention

The present invention relates generally to a Multiple Input Multiple Output (MIMO) system, and in particular, to a transmit (TX) antenna switching apparatus and method in a MIMO system.

2. Description of the Related Art

Mobile communication systems are normally designed so a plurality of mobile stations (MSs) can communicate with one another via a single base station (BS). When the BS performs a high-speed data transmission to the MSs, a fading phenomenon occurs due to characteristics of radio channels. To overcome the fading phenomenon, a Transmit Antenna Diversity scheme, which is a kind of a multiple antenna scheme, has been proposed.

The Transmit Antenna Diversity scheme transmits signals using plural TX antennas, instead of a single TX antenna, thereby minimizing a loss of TX data due to the fading phenomenon and increasing a data rate. The multiple antenna scheme is classified into a transmit diversity scheme and a spatial multiplexing scheme. The transmit diversity scheme obtains a transmit diversity by transmitting the same data through two TX antennas, and the spatial multiplexing scheme transmits different data through different TX antennas.

A conventional BS has two antennas where one is used as a receive (RX) antenna for a receive diversity gain and the other is used as a TX/RX antenna. In practice, however, a BS normally uses one fixed TX antenna and uses an RX antenna as a dedicated RX diversity antenna.

In this way, when the fixed TX antenna is used, downlink performance is degraded because a channel environment between the fixed TX antenna and the user is different from a channel environment between the RX diversity antenna and the user.

SUMMARY OF THE INVENTION

An object of the present invention is to substantially solve at least the above problems and/or disadvantages and to provide at least the advantages below. Accordingly, an object of the present invention is to provide a TX antenna switching apparatus and method in a MIMO system.

Another object of the present invention is to provide a TX antenna switching apparatus and method in a MIMO system, in which a downlink frame is transmitted through an optimal TX antenna selected according to channel environment, thereby improving downlink performance.

According to one aspect of the present invention, a TX antenna switching method in a MIMO system includes determining modulation orders of users by using reception strengths of user signals with respect to each antenna; summing the determined modulation orders for each antenna; and determining as a transmit antenna an antenna having the greatest sum of the modulation orders.

According to another aspect of the present invention, a transmit antenna switching apparatus in a MIMO system includes a CINR estimator for estimating CINRs of users by extracting pilot signals from uplink frames of the users for each antenna; a controller for determining modulation orders according to the estimated CINRs of the users to be allocated to downlink frames, and determining as a transmit antenna an antenna having greatest sum of the determined modulation orders of the users; and an antenna path switching module for switching the transmit antenna under control of the controller.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention is applied to a multiple transmit antenna system.

The present invention provides a TX antenna switching apparatus and method in a MIMO system. In using a plurality of TX antennas, an optimal TX antenna is selected among the TX antennas and data is transmitted through the selected TX antenna, instead of using a transmission power divided by N, thereby improving the transmission performance. A Time Division Duplex (TDD) system using two antennas will be taken as an example.

Figure 1:
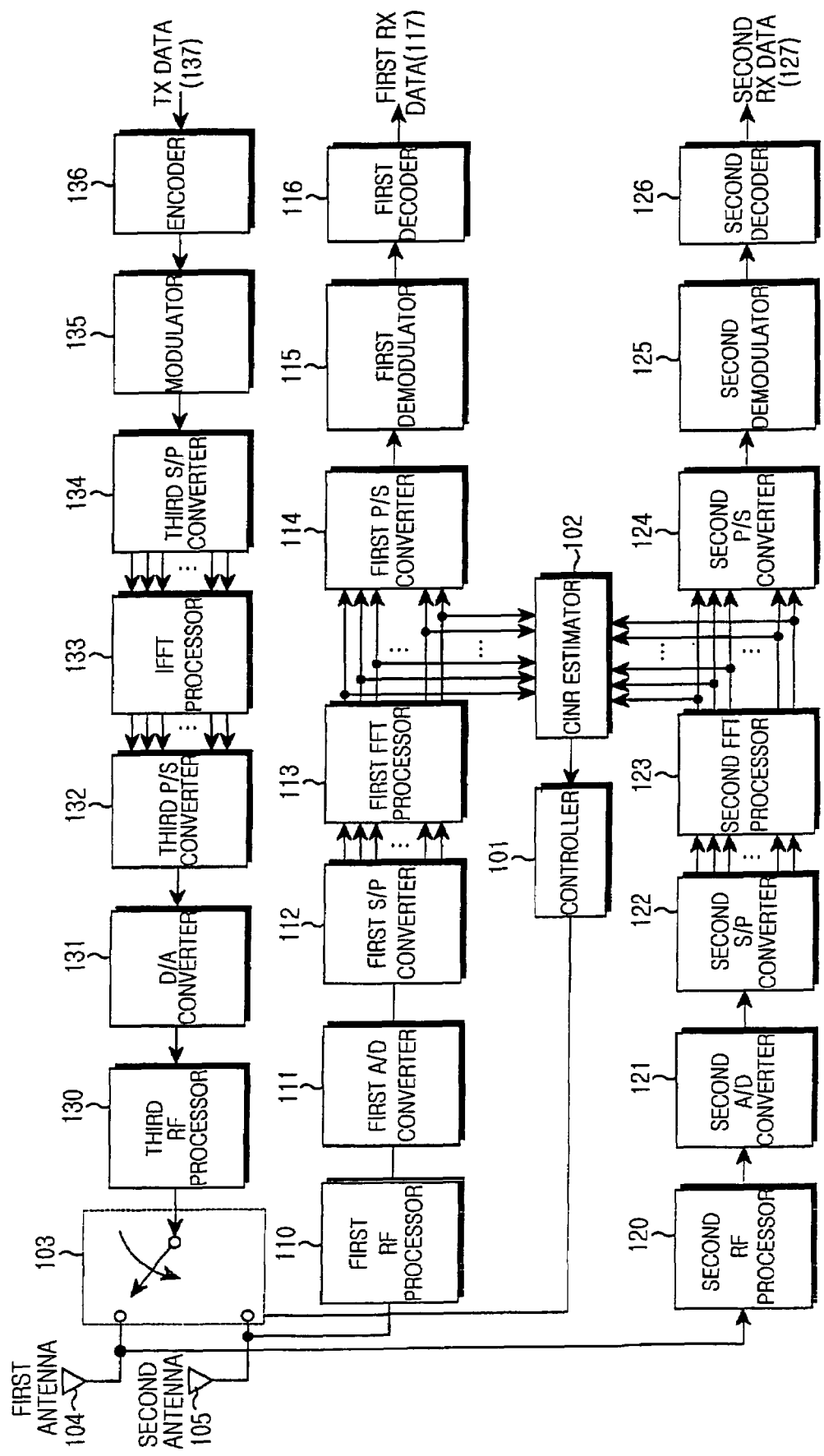
FIG. 1 is a block diagram of a MIMO system according to the present invention.

Referring to FIG. 1, a MIMO system according to the present invention includes a controller 101, a carrier to interference and noise ratio (CINR) estimator 102, an antenna path switching module 103, a plurality of TX/RX antennas 104 and 105, a plurality of receiver components 110-116 and 120-126, and transmitter components 130-136.

The controller 101 determines users to be allocated to downlink frames by using the CINRs of the users, which are estimated for each antenna by the CINR estimator 102. In addition, by referring to a modulation order table, the controller 101 determines modulation orders according to CINRs of the allocated users. The controller 101 sums all the modulation orders of the determined users with respect to the antennas, and determines an antenna having the greatest sum value as a TX antenna. When the determined TX antenna is not identical to a previous antenna, the controller 101 controls the antenna path switching module 103 to switch to the determined TX antenna. Moreover, the controller 101 determines a transmission scheme of the transmitter components 130-136 by using control information according to the determined modulation orders of the users, for example, a modulation scheme and a coding rate, and provides the transmitter components 130-136 with a control signal for implementing the determined transmission scheme.

The CINR estimator 102 extracts pilot signals of uplink frames outputted from first and second Fast Fourier Transform (FFT) processors 113 and 123, estimates the CINRs of the users with respect to the antennas, and outputs the estimated CINRs to the controller 101. In the present invention, CINR is an example value to describe a Channel Quality Indicator (CQI). Therefore, CINR estimator can also be referred as a CQI estimator. A Signal to Noise Ratio (SNR) can also be used to indicate CQI.

The antenna path switching module 103 switches the TX antenna under control of the controller 101. The second antenna 105 and the first antenna 104 transmit the uplink frames received from the users to first and second radio frequency (RF) processors 110 and 120 of first and second receiver components 110-116 and 120-126, respectively. In addition, the antenna path switching module 103 transmits the downlink frames received from the third RF processor 130 of the transmitter components 130-136 to the users through the determined TX antenna.

The first receiver components 110-116 and the second receiver components 120-126 output first and second RX data 117 and 127 from the uplink frames received through the second antenna 105 and the first antenna 104, respectively. The first receiver components 110-116 include the first RF processor 110, a first analog-to-digital (A/D) converter 111, a serial/parallel (S/P) converter 112, the first FFT processor 113, a first parallel/serial (P/S) converter 114, a first demodulator 115, and a first decoder 116. The second receiver components 120-126 have the same structure as that of the first receiver components 110-116.

The first RF processor 110 receives radio data signals through the second antenna 105 and outputs the received radio data signals to the first A/D converter 111. The A/D converter 111 converts the analog signals received from the first RF processor 110 into digital signals, and outputs the digital signals to the first S/P converter 112. The digital signals are time-domain sample data.

The first S/P converter 112 converts the serial data received from the first A/D converter 111 into parallel data, and outputs the parallel data to the first FFT processor 113. The first FFT processor 113 FFT-processes the parallel data to output frequency-domain data.

The first P/S converter 114 rearranges subcarrier values outputted from the first FFT processor 113 on a tile basis to convert the parallel data into serial data. A "tile" is a plurality of subcarriers. The first demodulator 115 demodulates data received from the first P/S converter 114 in accordance with a corresponding demodulation scheme, and the first decoder 116 channel-decodes the demodulated data at a corresponding coding rate, thereby recovering the information data.

The transmitter components 130-136 output TX data 137 as downlink frames through the first or second antenna 104 or 105 under control of the controller 101. The transmitter components 130-136 include an encoder 136, a modulator 135, a third S/P converter 134, an inverse FFT (IFFT) processor 133, a third P/S converter 132, a D/A converter 131, and a third RF processor 130.

The encoder 136 encodes the TX data 137 at a coding rate provided from the controller 101 to output coded bits or symbols to the modulator 135. For example, the encoder 136 may be a convolution coder, a turbo coder, a low density parity check (LDPC) coder, and a convolution turbo coder (CTC) converter.

The modulator 135 modulates data input from the encoder 136 in accordance with the modulation scheme provided from the controller 101. That is, the modulator 135 maps signal points in a constellation diagram in accordance with a given mapping scheme. Examples of the modulation scheme include a Binary Phase Shift Keying (BPSK) mapping 1 bit (s=1) to a single signal point (complex symbol), a Quadrature Phase Shift Keying (QPSK) mapping 2 bits (s=2) to a single complex symbol, an 8-ary Quadrature Amplitude Modulation (8QAM) mapping 3 bits (s=3) to a single complex symbol, a 16QAM mapping 4 bits (s=4) to a single complex symbol, and a 64QAM mapping 6 bits (s=6) to a single complex symbol.

The third S/P converter 134 maps output symbols of the modulator 135 in a corresponding frequency-time domain under control of the controller 101. The channels are classified into diversity channels and band adaptive modulation coding (AMC) channels.

The diversity channel scheme constructs subchannels with frequency tones spread over an entire band of an Orthogonal Frequency Division Multiplexing Access (OFDMA), and the band AMC channel scheme constructs a plurality of bands with adjacent frequency tones of an entire band of the OFDMA. The AMC adaptively changes the modulation scheme and the coding scheme according to radio environments, thereby improving data throughput. Since a basic process has been well known, its detailed description will be omitted.

The IFFT processor 133 N-point IFFT-processes the data mapped to the frequency subcarriers by the third S/P converter 134 to output time-domain data symbols (OFDM symbols) to the third P/S converter 134.

The third P/S converter 132 converts the signals inputted from the IFFT processor 133 into serial signals, and the D/A converter 131 converts the serial signals into analog signals. The third RF signal processor 130 RF-processes the analog signals outputted from the D/A converter 131 so they can be transmitted over air. Then, the RF-processed signals are transmitted over air through the TX antennas 104 and 105.

Figure 2:
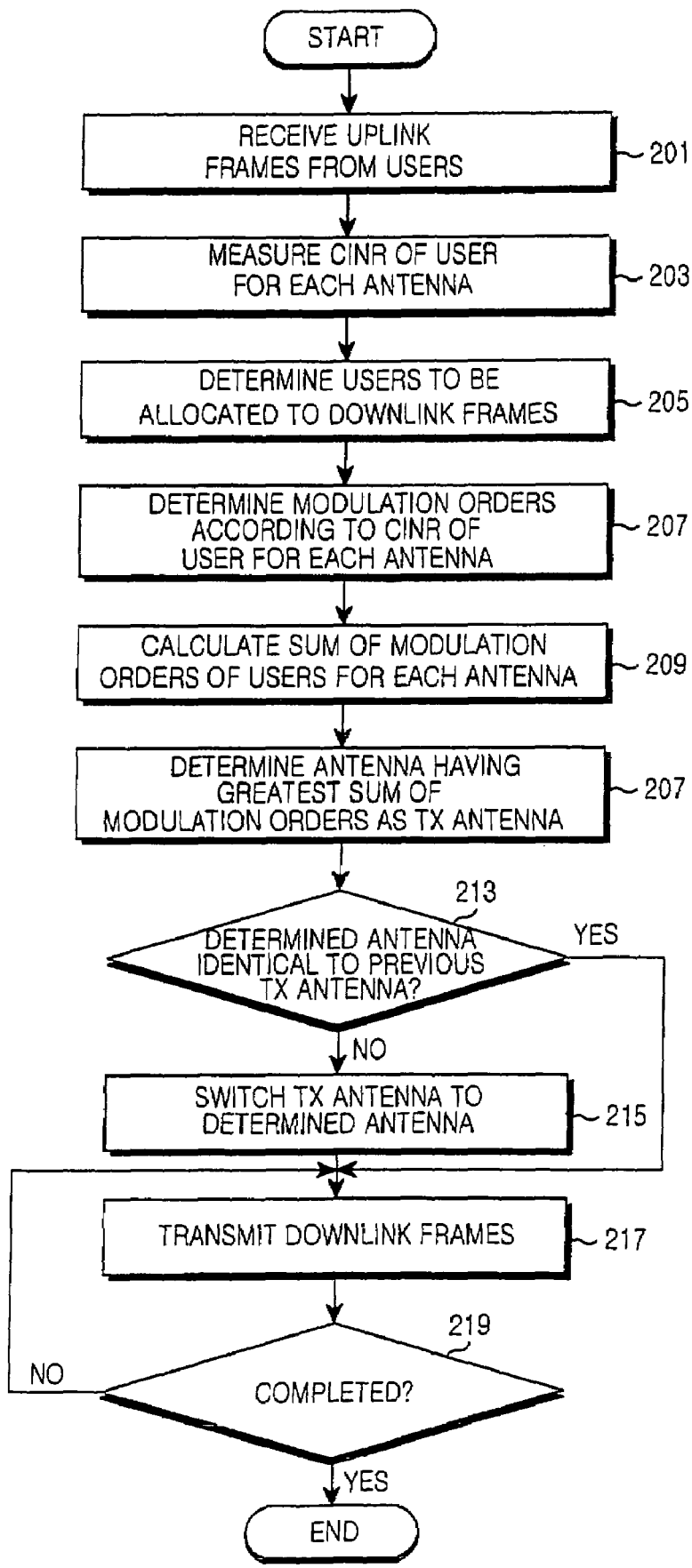
FIG. 2 is a flowchart illustrating a TX antenna switching method in the MIMO system according to the present invention.

Referring to FIG. 2, the BS receives the uplink frames from all active users belonging to a cell through the first and second antennas 104 and 105 in step 201. The uplink frames received through the second antenna 105 and the first antenna 104 are output as first and second RX data 117 and 127 through first and second receiver components 110-116 and 120-126 each including an RF processor, an A/D converter, an S/P converter, an FFT processor, a P/S converter, a demodulator, and a decoder.

In step 203, the CINR estimator 102 of the BS extracts pilot signals from frequency-domain data signals output from FFT processors 113 and 123 of receiver components 110-116 and 120-126, and measures the CINRs of the users for each antenna by using the extracted pilot signals, and transmits the measured CINRs to controller 101. The CINR is defined by dividing a total sum of signal powers of the subcarriers by a total sum of noise and interference power. The CINR is the criteria for determining TX/RX channel quality.

Then, controller 101 receives the measured CINRs and allocates the users having the excellent CINR to the downlink frames in step 205. The BS has the limited serviceable resources, and a user path loss and a channel gain are different according to distance from the BS. Therefore, the resources are allocated to the users having the excellent CINRs.

In step 207, the controller 101 determines modulation orders of the users for each antenna according to the CINRs of the allocated users. At this point, modulation orders are determined based on a predefined table. Table 1 shows modulation schemes and modulation orders according to CINRs.

TABLE 1

| Modulation Order | Modulation Scheme | CINR (dB) |
| --- | --- | --- |
| 1 | QPSK ½ | 4 dB |
| 2 | QPSK ¾ | 7 dB |
| 3 | 16QAM ½ | 10 dB |
| 4 | 16QAM ¾ | 13 dB |
| 5 | 64QAM ⅔ | 16 dB |
| 6 | 64QAM ¾ | 19 dB |
| 7 | 64QAM ⅚ | 22 dB |

When the CINR of the user is 10 dB, the modulation order of the user is determined as 3. The modulation scheme uses QPSK, 16QAM, and 64 QAM according to the data rate.

In step 209, controller 101 calculates a sum of the modulation orders of the users for each antenna. A sum of the modulation orders of the allocated users with respect to $j^{th}$ TX antenna is calculated using Equation (1):

$$mo_j = \sum_{k=1}^{N} \text{Modulation-order}_j(k) \quad (1)$$

where k represents the user, j represents the $j^{th}$ TX antenna, and $mo_j$ represents the sum of the modulation orders of the users 1 to N with respect to the $j^{th}$ TX antenna.

In step 211, the controller 101 determines the antenna having the greatest sum of the modulation orders among the antennas, and selects the determined antenna as the TX antenna. The TX antenna is selected using Equation (2):

$$tx\text{-}ant = \max(mo_1, mo_2, \ldots, mo_j, \ldots, mo_i) \quad (2)$$

where i represents the number of antennas, and tx-ant represents the TX antenna having the greatest sum of the modulation orders among the antennas 1 to i.

In step 213, controller 101 determines if the TX antenna determined using Equation (2) is identical to the previous TX antenna. When the determined TX antenna is not identical to the previous TX antenna, controller 101 controls the antenna path switching module 103 to switch the TX antenna to the determined antenna in step 215. When the antenna path switching module 103 switches the TX antenna to the determined antenna, the BS transmits the downlink frames to the allocated user through the determined antenna in step 217.

When the determined antenna is identical to the previous TX antenna, controller 101 controls the antenna path switching module 103 to maintain the previous TX antenna as the TX antenna, and transmits the downlink frames to the allocated user through the antenna in step 217.

In step 219, controller 101 determines if the transmission of the downlink frames is completed. If not completed, the process returns to step 217. On the other hand, if completed, the process of the present invention is terminated.

According to the present invention, the antenna having the greatest sum of the modulation orders according to the CINRs of the users for each antenna is selected as the TX antenna. Thus, the downlink frames can be transmitted through the optimal TX antenna according to the channel environment. Consequently, the method according to the present invention can improve the downlink performance compared with the conventional method using the fixed TX antenna.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A transmit antenna switching method in a multiple transmit antenna system, the method comprising:
   determining modulation orders of users by using reception strengths of user signals at each antenna;
   summing the determined modulation orders for each antenna;
   determining as a transmit antenna an antenna having a greatest sum of the modulation orders;
   selecting users to be allocated to downlink frames according to the reception strengths;
   allocating transmit data of the selected users to the downlink frames; and
   transmitting the downlink frames through the determined transmit antenna.

2. The transmit antenna switching method of claim 1, wherein the modulation order is previously determined according to the reception strengths of the user signals.

3. The transmit antenna switching method of claim 1, further comprising measuring the reception strengths of the user signals for each antenna when uplink frames are received from the users.

4. The transmit antenna switching method of claim 1, wherein the reception strengths are carrier to interference and noise ratio (CINR).

5. A transmit antenna switching apparatus in a multiple transmit antenna system, the apparatus comprising:
   a carrier to interference and noise ratio (CINR) estimator for estimating CINRs of users by extracting pilot signals from uplink frames of the users for each antenna;
   a controller for determining modulation orders according to the estimated CINRs of the users to be allocated to downlink frames, and determining as a transmit antenna an antenna having greatest sum of the determined modulation orders of the users; and
   an antenna path switching module for switching the transmit antenna under control of the controller.

6. The transmit antenna switching apparatus of claim 5, wherein the controller selects users to be allocated to the downlink frames according to the estimated CINRs.

7. The transmit antenna switching apparatus of claim 6, further comprising:
   an encoder and modulator for encoding and modulating transmit data of the selected users according to the determined modulation orders;
   an Inverse Fast Fourier Transform (IFFT)-processor for allocating the transmit data of the selected users to the downlink frames; and
   a radio frequency (RF)-processor for converting sample data outputted from the IFFT-processor into RF signals to output the RF signals to the antenna path switching module.

8. A transmit antenna switching method in a multiple transmit antenna system, the method comprising:
   determining modulation orders of corresponding users at each antenna;
   determining as a transmit antenna an antenna having greatest modulation orders;
   selecting users to be allocated to downlink frames according to the reception strengths;
   allocating transmit data of the selected users to the downlink frames; and
   transmitting the downlink frames through the determined transmit antenna.

9. The transmit antenna switching method of claim 8, wherein the modulation order is determined according to the reception strengths of the user signals.

10. The transmit antenna switching method of claim 8, further comprising measuring the reception strengths of the user signals for each antenna when uplink frames are received from the users.

11. The transmit antenna switching method of claim 8, wherein the reception strengths are carrier to interference and noise ratio (CINR).

12. A transmit antenna switching apparatus in a multiple transmit antenna system, the apparatus comprising:
   a channel quality indicator (CQI) estimator for estimating a quality of channels of corresponding users at each antenna;
   a controller for determining modulation orders according to the estimated channel quality of the users, and determining as a transmit antenna an antenna having greatest sum of the determined modulation orders of the users; and
   an antenna path switching module for switching the transmit antenna under control of the controller.

13. The transmit antenna switching apparatus of claim 12, wherein the controller selects users to be allocated to the downlink frames according to the estimated carrier to interference and noise ratios (CINRs).

14. The transmit antenna switching apparatus of claim 12, further comprising:
   an encoder and modulator for encoding and modulating transmit data of the selected users according to the determined modulation orders;
   an Inverse Fast Fourier Transform (IFFT)-processor for allocating the transmit data of the selected users to the downlink frames; and
   a radio frequency (RF)-processor for converting sample data outputted from the IFFT-processor into RF signals to output the RF signals to the antenna path switching module.

* * * * *